United States Patent
Bailie (10) Patent No.: US 10,095,481 B2
(45) Date of Patent: Oct. 9, 2018

(54) SYSTEM AND METHOD FOR COMMUNICATION BETWEEN A PROGRAMMER INTERFACE AND AN ELECTRONIC DEVICE

(71) Applicant: ARRIS Global Ltd., Shipley (GB)

(72) Inventor: Mark Bailie, Shipley (GB)

(73) Assignee: ARRIS Global Ltd., West Yorkshire (GB)

( * ) Notice: Subject to any disclaimer, the term of this patent is extended or adjusted under 35 U.S.C. 154(b) by 0 days.

(21) Appl. No.: 14/476,509

(22) Filed: Sep. 3, 2014

(65) Prior Publication Data

US 2015/0074637 A1    Mar. 12, 2015

(30) Foreign Application Priority Data

Sep. 10, 2013    (GB) .................................. 1316073.4

(51) Int. Cl.
G06F 9/44        (2018.01)
G06F 8/30        (2018.01)
G06F 8/00        (2018.01)

(52) U.S. Cl.
CPC . G06F 8/30 (2013.01); G06F 8/00 (2013.01)

(58) Field of Classification Search
CPC .......... G06F 8/00; G06F 8/30; G06F 11/3656; G06F 11/3664
USPC ...................................................... 717/109
See application file for complete search history.

(56) References Cited

U.S. PATENT DOCUMENTS

| 6,058,434 A * | 5/2000 | Wilt ........................ G06F 13/00 709/217 |
| 7,024,660 B2 * | 4/2006 | Andrade ............... G06F 11/263 714/25 |
| 2003/0088710 A1 * | 5/2003 | Sandhu ..................... G06F 8/20 719/321 |
| 2007/0011522 A1 * | 1/2007 | Denniston ...... G01R 31/318314 714/724 |
| 2009/0019270 A1 | 1/2009 | Halter et al. |
| 2013/0305218 A1 * | 11/2013 | Hirsch ...................... G06F 8/36 717/106 |

OTHER PUBLICATIONS

"Wind River Workbench User's Guide", version 2.5, Wind River Systems, Inc., 2006, 406pg.*
Publication and European Search Report, European Patent Publication No. EP 2 846 260 A1; dated Mar. 11, 2015.

* cited by examiner

Primary Examiner — Ryan D. Coyer
(74) Attorney, Agent, or Firm — Stewart M. Wiener (57) ABSTRACT

The invention relates to an application and a method for allowing the development or adaptation of an application for implementation in an embedded processing system. The apparatus and method includes the use of a programmer interface to allow the input of instructions and the development and/or adaptation of the application and to allow the use of one or more development and/or diagnostic tools via the programmer interface and the embedded system in which the application is to be implemented. A server is provided which allows communication between the said application and the embedded system during the development and/or adaptation of the application so as to allow a greater variety of user interaction and development and diagnostic tools to be available for use.

15 Claims, 6 Drawing Sheets

SYSTEM AND METHOD FOR COMMUNICATION BETWEEN A PROGRAMMER INTERFACE AND AN ELECTRONIC DEVICE

CROSS-REFERENCE TO RELATED APPLICATIONS

This application claims priority to United Kingdom Patent Application No. 1316073.4 filed Sep. 10, 2013 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention to which this application relates is a system and method which allows improved interaction and communication between at least one electronic device via which at least one application can be performed and a programmer interface which is provided with means to allow the application to be developed and/or adapted with reference to the electronic device by a programming expert via the said interface.

2. Prior Art

In particular, although not necessarily exclusively, the invention is for use in development of software code that allows the execution of one or more applications in embedded processing systems such as those that are provided in electronic devices in the form of any, or any combination, of broadcast data receivers (set top boxes), mobile phones, personal digital assistants (PDA'S) or the like. An embedded system is typically designed and optimised to perform a dedicated function (as compared to a personal computer (PC) which is a general purpose computing platform with a wide range of interfaces, software options and expansion possibilities). An embedded system contains a processing core.

Conventionally, when developing and/or adapting an application for a processing system which is embedded within a device (hereinafter referred to as an embedded system in a non-limiting manner), a problem which is often experienced is that there is a lack of diagnostic and development tools or devices which allow the required extent of programmer interaction with the embedded system in order to allow the development and/or adaptation to be performed in as efficient a manner as possible. For example, there may be a lack of de-bugging tools which would allow the programmer to stop, start, step, introduce break points, extract values, make changes and generally interact efficiently with the embedded system. A further problem is that those tools which may be provided within the embedded system for the programmer to interact with, can create subsequent problems in the operation of the embedded system itself and/or require relatively high performance connection means to be provided with the embedded system in order to allow programmer access and communication and control of the diagnostic tools which are provided as part of the embedded system. The communication with the embedded systems in this manner is most often achieved through the provision of external interfaces such as a USB which have limited capabilities and which themselves require considerable software processing capability in order for the diagnostic communication to be successfully achieved. This can introduce latency in the operation and performance of the embedded system and/or alter and/or affect the performance of the embedded system in terms of its behaviour and predictability.

A known alternative approach is to provide a suite of diagnostic tools which, in order for the same to be used, require the embedded system to be disassembled and then allow the connection to these components of relatively specialised signal and data processors. These tend to be expensive and are often specialist or professional grade diagnostic tools which require specific adaptation of the embedded system hardware to be provided during the device development and which are subsequently removed from the finished embedded design. As a result of this specialism requirement, these diagnostic tools are not easily used by a broad community of potential programmers who may wish to generate applications for the embedded system and so the use of this solution is limited.

A further known approach is to generate an emulation of the embedded system in order to allow the programmer to develop and/or adapt an application for use with the actual embedded system. However the development and/or adaptation is performed with reference to the emulation of the embedded system rather than the actual embedded system and, while this can be achieved by using a wider range of development and diagnostic tools which are provided on suitable processing apparatus, such as a PC, and thereby allow the emulated embedded system to be adapted and developed as required, the success of this approach relies entirely on the quality of the emulation of the embedded system. That emulation would need to include proxies for the user interfaces found on the embedded system, such as a touchscreen approximation that would normally be used by an end user of that application and/or service interfaces, such as establishing a mobile phone connection or acquiring and validating usage rights data associated with a pay-tv channel. If a poorly emulated embedded system is used, the developments and adaptations which are made, and which may appear to be operating correctly in the emulation of the embedded system, may, when attempted to be performed on the actual embedded system, be found not to operate as required. This can mean that the application cannot be performed on the embedded system in the expected manner.

Thus, the conventional options available for programmers to develop applications, software and code for use in an embedded system are found to be problematic. The option of the application code being written and compiled with direct interaction with the embedded system, requires the iterative steps of executing the application, checking the same to see if it works, and, if it doesn't, adapting the code and software and then repeating the execution and checking steps and so on until the application performs correctly. It will be appreciated that this is a relatively unscientific approach and can take considerable time until the appropriate code for the implementation of the application is achieved. The alternative of developing the application code within a development environment which is isolated from the actual embedded system, and compiling and executing the same with reference to the emulation of the embedded system within the development environment, does have the benefit of making more diagnostic tools available to the programmer, but has the significant disadvantage of potentially unreliable emulations of the embedded system being used.

The aim of the present invention is therefore to provide a system and method whereby the development of software and the code for an application to be implemented in an embedded system of an electronic device, can be performed in a more reliable and efficient manner.

BRIEF SUMMARY OF THE INVENTION

In a first aspect of the invention, there is provided apparatus for the development and/or adaptation of an application for implementation in an embedded system, said apparatus including a programmer interface to allow the input of instructions and the development and/or adaptation of the application and allow the use of one or more diagnostic tools provided as part of, or accessible via, said programmer interface and the embedded system in which the application is to be implemented, and wherein the apparatus further includes a server which allows communication between the said application and the embedded system during the development and/or adaptation of the application.

The provision of the server to allow communication between the application and the embedded system, means that the advantages of providing a programmer interface within a development environment can be achieved and thereby allows the programmer access to a larger suite of diagnostic and development tools which can be referred to and used during the development process. Typically all, most, or at least some, of these diagnostic and/or development tools would not typically be available when implementing and developing the application directly with the embedded system.

The provision of the communication system also allows reference to be made to the actual embedded system during the development and/or adaptation of the application rather than an emulation of the embedded system and thereby allows the development and/or adaptation to be performed in relation to the embedded system in which the application, once developed and/or adapted, will be implemented and therefore allows more accurate feedback of the development and/or adaptation of the application to be provided during the development process.

Typically the communication which is provided allows the inputs and/or outputs of the embedded system to be controlled via the application.

In one embodiment, the programmer interface is a personal computer with means to access diagnostic and development tools.

In one embodiment, the embedded system is provided within an electronic device such as a set top box, mobile phone, tablet device or the like.

In one embodiment, the communication means allows the programmer to select to achieve communication via the programmer interface with one or more available embedded systems, or versions of an embedded system, so as to allow the development of the application with respect to a specific embedded system and possible variants thereof so as to ensure that the application which is used in a particular embedded system, is adapted for use with that particular embedded system.

Typically, the software in an embedded system is built up in a number of layers comprising of any, or any combination, of drivers, an operating system, middleware and applications.

In one embodiment, the communication between the embedded system and the application is achieved via the middleware layer which acts as a browser and as the interface to the application software. The embedded system browser is directed to a proxying server which provides a connection application. The connection application provides a communication channel which allows the relaying of messages between the embedded system middleware and the proxying server and between the server and the application being developed by the programmer.

Typically, when the application development and/or adaptation is completed for a particular embedded system, the code for the application is added into the embedded system in the application layer and operated via the browser in the middle layer in order to execute the application on the device with which the embedded system is provided.

In a further aspect of the invention, there is provided a method of developing an application for use in an embedded system, said method comprising the steps of providing a programmer interface with which the programmer interacts to generate code and develop the application, providing an embedded system in which the application, once complete, is to be used, establishing a proxying server, wherein communication is established between the application and the proxying server, and the proxying server and the embedded system to allow messages and data to be transferred between the application and the embedded system via the proxying server.

In one embodiment the method includes the step of identifying the particular version of the embedded system for which the application is to be developed and accessing the identified embedded system to allow the application, during development and/or adaptation at the programmer interface, to be implemented in the embedded system for test purposes. Messages can be transmitted from the embedded system to the programmer interface to indicate test results and, once finalised, the application can be implemented in the identified version of the embedded system in the electronic device.

In one embodiment the method allows the selective communication of the application with a plurality of embedded systems and selection means are provided to allow the programmer to select a particular one, or more, of the embedded systems with which to communicate in the development of a particular application.

In one embodiment the method includes the selection of successive versions of the embedded system and, where appropriate, the adaptation of the application with reference to the particular selected version of the embedded system.

BRIEF DESCRIPTION OF THE SEVERAL VIEWS OF THE DRAWING(S)

Specific embodiments of the invention will now be described with reference to the accompanying figures; wherein.

DETAILED DESCRIPTION OF THE INVENTION

Figure 1:
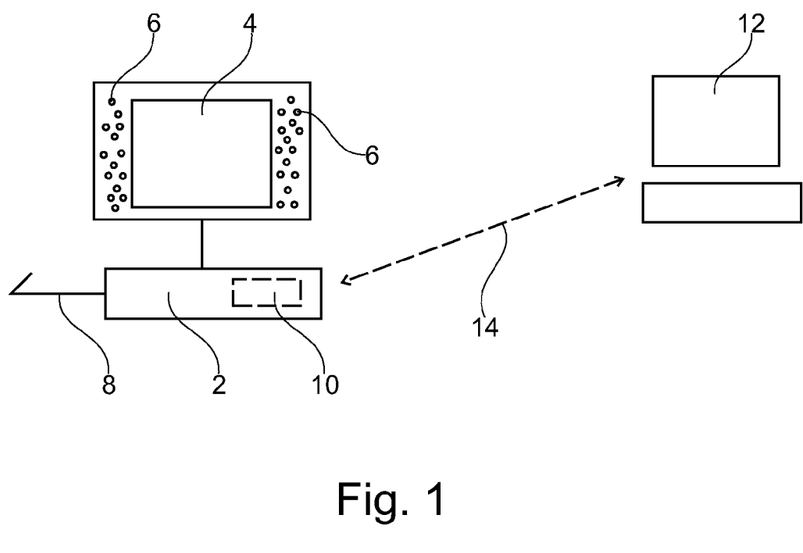
FIG. 1 illustrates schematically components of the invention according to one embodiment.

Referring firstly to FIG. 1 there is illustrated a simplified embodiment of the invention in which there is shown an electronic device which in this case is in the form a broadcast data receiver 2 which is connected to a display screen 4 and speakers 6 to allow video and/or audio to be displayed therefrom.

The broadcast data receiver is provided with means 8 to receive data which is transmitted from a remote location such as by satellite transmission and/or cable transmission. The data is processed in response to user selections to view certain programmes. The broadcast data receiver includes at least one embedded processing system 10 therein (shown in broken lines). The embedded processing system allows various functions and applications of the broadcast data receiver to be performed and over time there may be a need for the embedded system to be updated and/or implement new applications. There is a need to be able to develop and/or adapt these new applications and that can be achieved by skilled persons in an efficient manner using the system and method as now described via a programmer interface in the form, in this embodiment, of a PC 12 which can be remote from the device 2 but in communication therewith via communication means 14.

Figure 2:
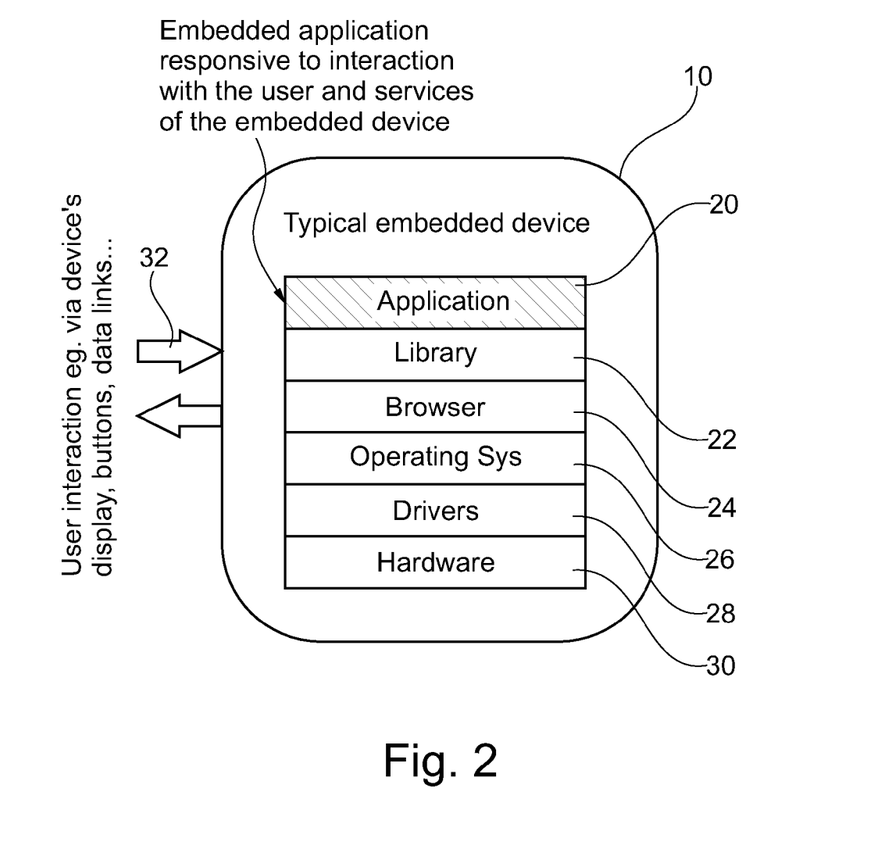
FIG. 2 illustrates an example of an embedded system with which the invention may be performed.

FIG. 2 illustrates an example of the configuration of an embedded system 10 of the type with which the current invention can be implemented. The system comprises a number of "layers" which include the application layer 20 which is responsive to the interaction with the programmer interface. The further layers include a library 22, which provides methods and resources by which the application can interact with the embedded device, a browser 24, operating system 26, one or more drivers 28 and hardware 30. Means 32 are also provided to allow normal user interaction with the embedded system, to operate the same, and typically via display, selection means and/or data links which to the user normally appears to be interaction with the device in which the embedded system is provided.

Figure 3:
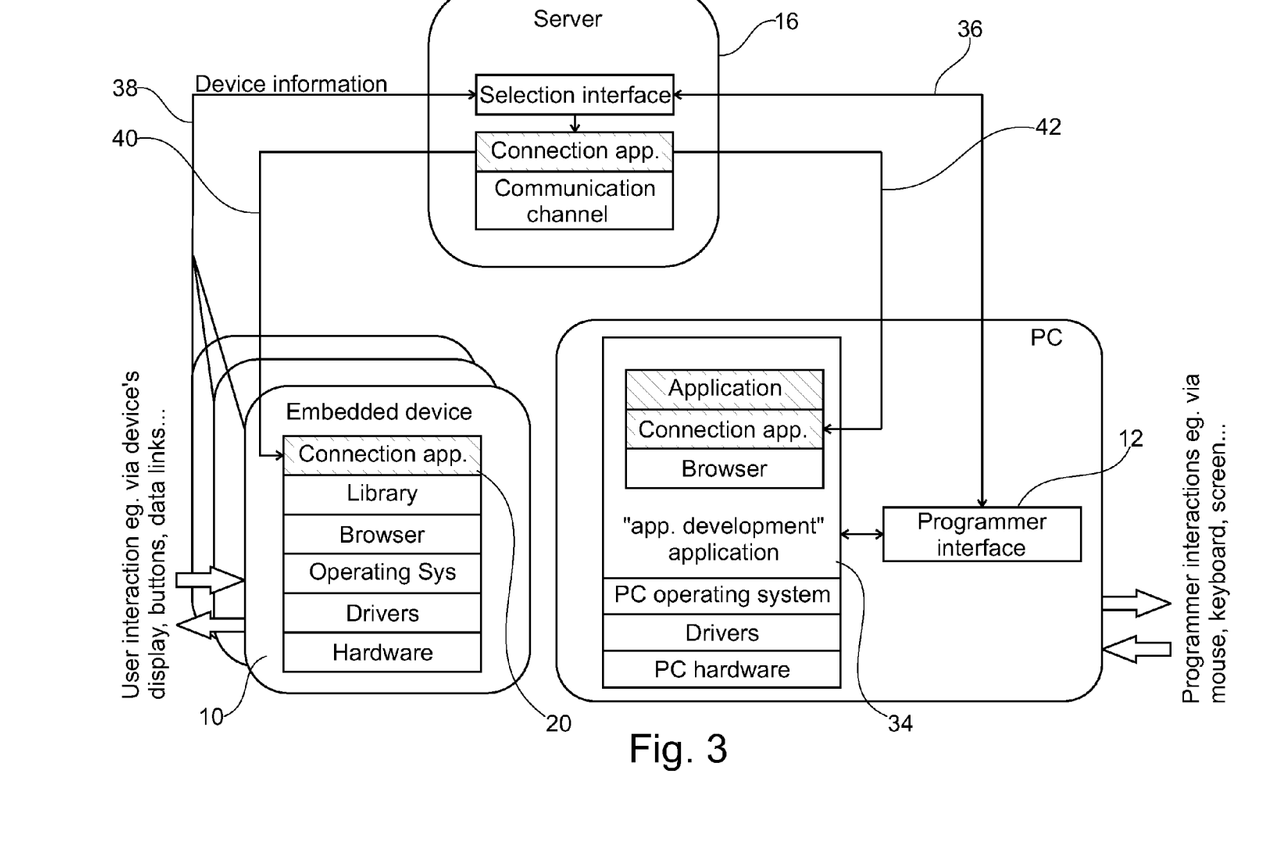
FIG. 3 illustrates in a schematic manner an embodiment of the apparatus in accordance with the invention.

FIG. 3 illustrates schematically the interaction between the embedded system 10, the proxy server 16 and the programmer interface 12. At the server 16, the functions of selection of the programmer interface 12 and provision of information relating to the embedded system can be achieved as indicated by communication arrows 36,38 respectively, along with connection between the application 20 of the embedded system 10 and the application development application 34 within the programmer interface 12 as indicated by communication arrows 40,42.

Figure 4:
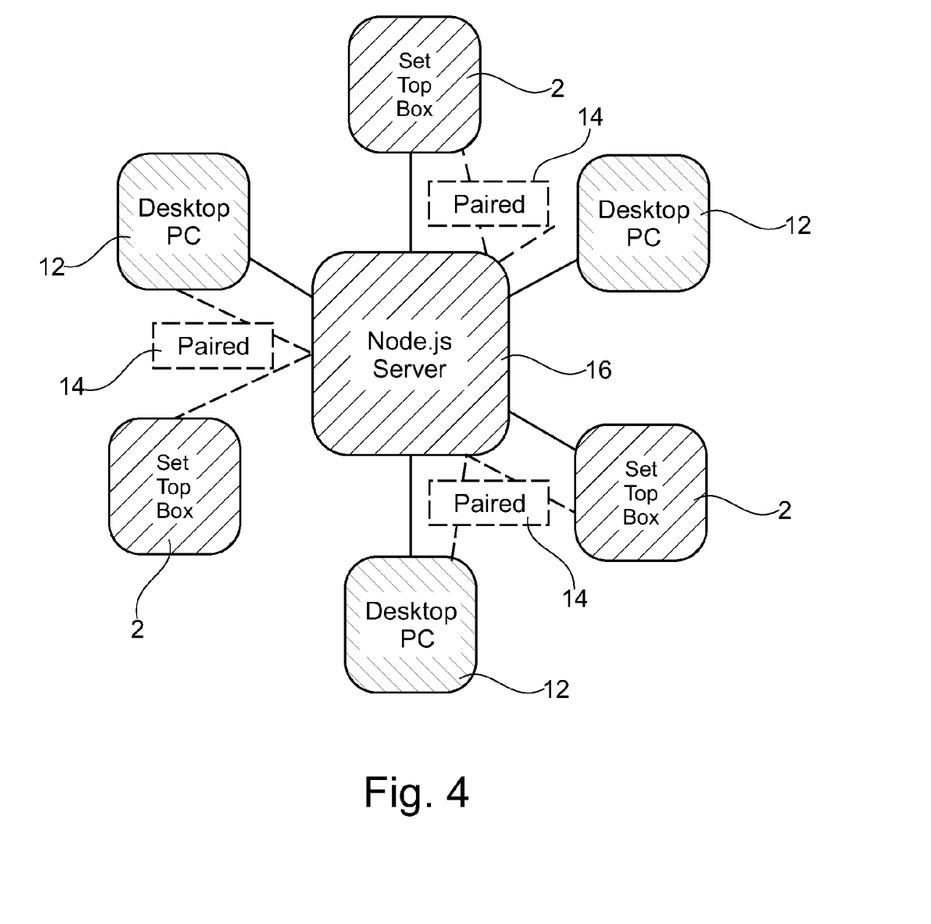
FIG. 4 illustrates the manner in which a number of programmer interfaces can be connected to a number of devices within which embedded systems are provided in accordance with one embodiment of the invention.

FIG. 4 illustrates how a number of broadcast data receivers 2 in which the embedded system is provided can be selectively connected to one or more programmer interfaces 12 via a node or proxy server 16 which is used as the communication means between the broadcast data receivers 2 and the programmer interfaces 12 and more importantly between the embedded system 10 and the application being developed at 12—in order to relay changes in a device's interfaces and so that messages are then passed between those broadcast data receivers 2 and the applications which are in communication or "paired" 14 at that time, typically using web sockets and HTTP requests.

Figure 5A:
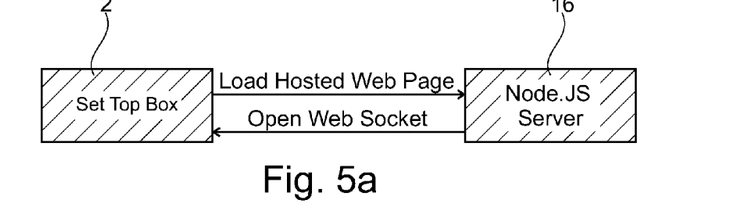
FIGS. 5a-e illustrate the steps followed to allow communication between the application and the devices in accordance with one embodiment of the invention.

FIGS. 5a-e illustrate the steps followed to establish the communication between the programmer interface 12 and the broadcast data receiver 2. FIG. 5a illustrates the first step of pointing the web browser provided as part of the broadcast data receiver 2 to a URL that loads a web page hosted by the server. When the web page has loaded a HTML web socket is opened to allow communication back to the server and the server then maintains a record of those broadcast data receivers, and hence embedded systems 10, that are connected to the programmer interface at that time.

Figure 5B:
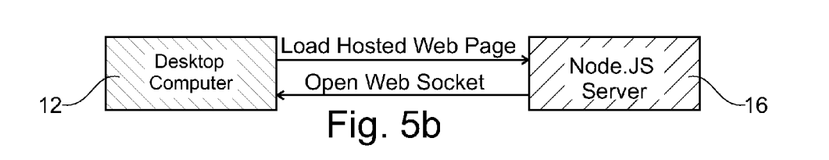

FIG. 5b illustrates how the web browser on the programmer interface 12 is also pointed to a URL that loads a web page, hosted by the server 16. When the web page has loaded, a HTML web socket is opened to allow communication back to the server 16 and the server then maintains a record of connected programmer interfaces 12 at that time, with the current list of connected broadcast data receivers being passed to the programmer interface via the newly established web socket so that the programmer is aware of the list of broadcast data receivers 2 and hence embedded systems 10 which are available to choose from.

Figure 5C:
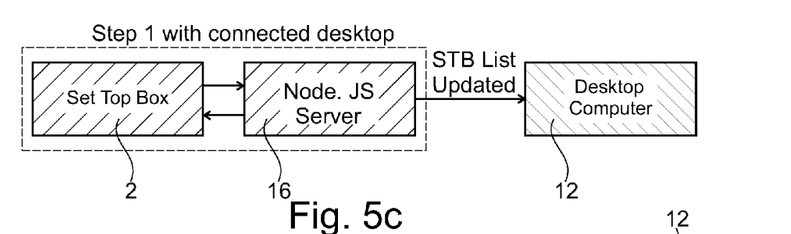
Figure 5D:
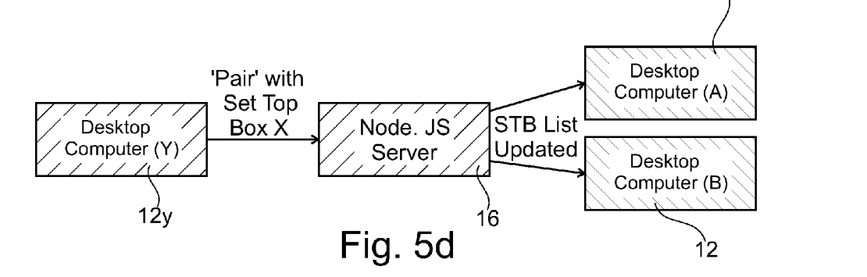

FIG. 5c illustrates that when new broadcast data receivers 2 are connected or existing ones are powered down the list of available broadcast data receivers 2 is updated at the programmer interface 12. When the programmer selects to connect or pair with the embedded system 10 of a particular broadcast data receiver 2 a request is sent as illustrated in FIG. 5d via the open web socket to the server 16, in this case to 'pair' broadcast data receiver 2X with programmer interface 12Y and so broadcast data receiver 2X is removed from the available broadcast data receiver list to prevent other programmers from connecting to it and thereby prevent potential conflicts between programmer activities on the same embedded system.

Figure 5E:
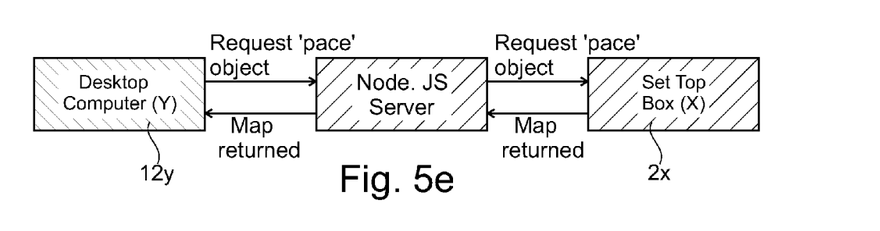

Once paired, a communications channel is established where server 16 routes messages between the broadcast data receiver 2X and the programmer interface 12Y. When in communication, a map of the embedded system application interface is requested by programmer interface 12Y from broadcast data receiver 2X. This map is a JSON representation of the embedded system application interface. The map received by the programmer interface is transformed into a Javascript object. This object has the same methods and constants defined as in the embedded system. This allows the dynamic generation of an object in the programmer interface that has an identical API to the paired broadcast data receiver. The application, being developed through the programmer interface 12Y, executes by reference to this object. This system has the benefit of easily switching between embedded devices with different versions of application interface whilst testing and developing an application.

Figure 6A:
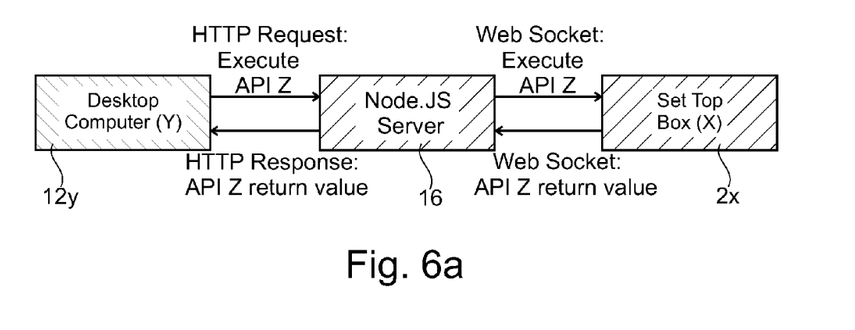
FIGS. 6a and b illustrates the manner in which messages can be transmitted between the application and the device in accordance with one embodiment of the invention.
Figure 6B:
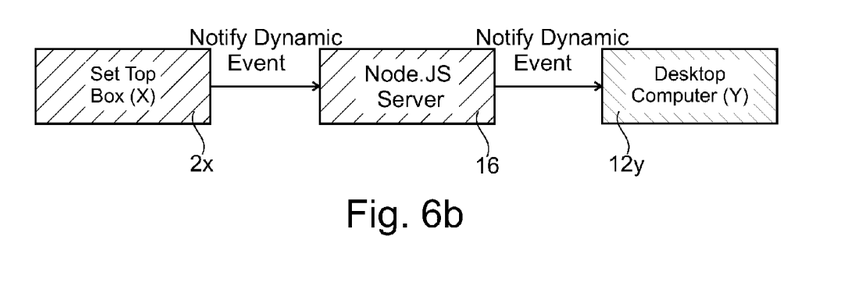

The object makes use of two techniques to pass messages over the communication channel as shown in FIGS. 6a,b.

Synchronous (handshaked request response) messages use standard AJAX, XHR requests to communicate with the server 16.

Asynchronous messages, typically representing the occurrence of a dynamic event on the broadcast data receiver (for example a recording has started or a key press has occurred on the broadcast data receiver) are communicated via the open web socket to the server 16 and then to the application being developed at 12.

The application itself may also generate asynchronous events (for example a time based expiry event). The messages from these events would also use web sockets, communicating from the application 12Y to the server 16 then on to the broadcast data receiver 2X.

The apparatus and method in accordance with the invention therefore provides an effective and efficient way of allowing the development and/or adaptation of applications for implementation in embedded systems whilst allowing interaction through the user interface of the embedded system and allowing access to programmer diagnostic and development tools via the programmer interface.

The invention claimed is:

1. An apparatus for development and/or adaptation of an application for implementation in an embedded system, the apparatus comprising:
   a programmer interface in a first electronic device comprising at least one computer processor, the programmer interface including access to diagnostic and development tools and to allow the input of instructions and the development and/or adaptation of the application and allow the use of one or more of the diagnostic tools provided as part of, or accessible via, the programmer interface and the embedded system within a second electronic device in which the application is to be implemented, the second electronic device distinct from the first electronic device, and the second electronic device comprising at least a second computer processor, wherein the application is embedded in the second electronic device and is responsive to interaction with a user and services of the second electronic device; and
   a server comprising at least a third computer processor, the server communicatively coupled to the first electronic device and to the second electronic device, which allows communication between the programmer interface of the first electronic device and the embedded system within the second electronic device, to allow the application to refer to and communicate with the embedded system within the second electronic device and to control the input and/or output of the embedded system within the second electronic device as the application is executed at the programmer interface during the development and/or adaptation of the application;
   wherein the communication allows access from the programmer interface, during the development and/or adaptation of the application, to an actual embedded system within the second electronic device in which the application is to be implemented rather than to an emulation of the embedded system.

2. The apparatus according to claim 1 wherein the server allows communication between the application and the embedded system within an application development environment.

3. The apparatus according to claim 1 wherein the programmer interface is a personal computer.

4. The apparatus according to claim 1 wherein the second electronic device is one of: a set top box, a mobile phone, and a tablet device.

5. The apparatus according to claim 1 wherein the allowance of communication allows the programmer to communicate via the programmer interface with one or more available embedded systems and/or versions of an embedded system to develop the application with respect to a specific embedded system and/or variants thereof.

6. The apparatus according to claim 5 wherein the software in the embedded system or version of the embedded system comprises one or more of: drivers, an operating system layer, a middleware layer, and an application layer.

7. The apparatus according to claim 6 wherein the communication between the embedded system and the application is achieved via the middleware layer which acts as a browser.

8. The apparatus according to claim 7 wherein the browser is directed to a proxying server which provides a connection application.

9. The apparatus according to claim 1 wherein a connection application provides a communication channel to allow transmission of messages between the embedded system middleware and the proxying sever and between the proxying server and the application being developed and/or adapted by the programmer.

10. The apparatus according to claim 1 wherein when the application development and/or adaptation is complete for a particular embedded system, the code for that application is added into the embedded system in the application layer and operated via a browser in the middleware layer in order to execute the application and device with which the embedded system is provided.

11. A method of developing an application for use in an embedded system within a second electronic device, the method comprising:
   providing a programmer interface with which a person interacts to generate code and develop the application and to access diagnostic and development tools, the programmer interface in a first electronic device comprising at least one computer processor;
   providing the embedded system within the second electronic device in which the application, once complete, is to be used, the second electronic device distinct from the first electronic device, and the second electronic device comprising at least a second computer processor, wherein the application is embedded in the second electronic device and is responsive to interaction with a user and services of the second electronic device;
   establishing a proxying server communicatively coupled to the first electronic device and to the second electronic device, the proxying server comprising at least a third computer processor, wherein communication is established between the programmer interface and the proxying server, and wherein communication is established between the proxying server and the embedded system to allow messages and data to be transferred between the application and the embedded system via the proxying server to allow the application to refer to and communicate with the embedded system within the second electronic device and control the input and/or output of the embedded system within the second electronic device as the application is executed at the programmer interface during the development and/or adaptation of the application;
   wherein the communication allows access from the programmer interface, during the development and/or adaptation of the application, to an actual embedded system within the second electronic device in which the application is to be implemented rather than to an emulation of the embedded system.

12. The method according to claim 11 further comprising:
identifying a particular version of the embedded system for which the application is to be developed and accessing the identified embedded system to allow the application to be implemented in the embedded system for test purposes.

13. The method according to claim 12 further comprising:
transmitting messages from the embedded system to the programmer interface to indicate test results;
wherein the application, once finalized, is implemented in the identified version of the system.

14. The method according to claim 11 wherein the method allows the selective communication of the application with a plurality of embedded systems and/or variants of an embedded system, and selection means are provided to allow the programmer to select a particular one or more of the embedded systems with which to communicate the development of a particular application.

15. The method according to claim 11 further comprising:
selecting successive versions of the embedded system and of the adaptation of the application, with reference to a particular selected version of the embedded system.

* * * * *